(12) United States Patent
Kong et al.

(10) Patent No.: US 6,993,062 B1
(45) Date of Patent: Jan. 31, 2006

(54) FORWARD LINK DEVICE OF MULTICARRIER COMMUNICATION SYSTEM AND METHOD FOR REALIZING THE SAME

(75) Inventors: Seung-Hyun Kong, Seoul (KR);
Jae-Min Ahn, Seoul (KR);
Soon-Young Yoon, Seoul (KR);
Kwang-Wook Yie, Seoul (KR);
Hee-Won Kang, Seoul (KR);
Young-Ky Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/193,213

(22) Filed: Nov. 17, 1998

(30) Foreign Application Priority Data

Nov. 17, 1997 (KR) .................................. 97-61616

(51) Int. Cl.
 *H04B 1/69* (2006.01)
(52) U.S. Cl. ..................................... 375/130
(58) Field of Classification Search ............... 375/130,
 375/140, 141, 146, 259, 295, 377; 370/335,
 370/342; 341/173
 See application file for complete search history.

(56) References Cited

U.S. PATENT DOCUMENTS 5,339,330 A * 8/1994 Mallinckrodt .............. 370/320
5,864,577 A * 1/1999 Ramel ..................... 375/130
6,101,176 A * 8/2000 Honkasalo et al. ......... 370/335
6,130,884 A * 10/2000 Sato ......................... 370/335
6,215,777 B1 * 4/2001 Chen et al. ................. 370/335
6,621,875 B2 * 9/2003 Odenwalder ............... 375/295

OTHER PUBLICATIONS

IEEE May 1996 Fischer et al. "Wideband CDMA System for Personal Radio Communications" pp. 1652 to 1655.*

\* cited by examiner

*Primary Examiner*—Mohammed Ghayour
*Assistant Examiner*—Pankaj Kumar
(74) *Attorney, Agent, or Firm*—Dilworth & Barrese LLP

(57) ABSTRACT

A forward link device of a multicarrier CDMA communication system with an overlay scheme in which a multicarrier system and an IS-95 system share same frequency bands. In the forward link device, four encoders encode input data of corresponding rates with a 1/3 coding rate, respectively. A first repeater repeats two times full rate symbols output from the first encoder, and second to fourth repeaters repeat symbols output from the second to fourth encoders, respectively, according to a predetermined number of times, to match the number of corresponding output symbols to the number of full rate symbols. First to fourth interleavers interleave the symbols output from the first to fourth repeaters, respectively, to uniformly distribute the symbols of the same data bit to the carriers.

10 Claims, 6 Drawing Sheets

FORWARD LINK DEVICE OF MULTICARRIER COMMUNICATION SYSTEM AND METHOD FOR REALIZING THE SAME

BACKGROUND OF THE INVENTION

1. Field of the Invention

The present invention relates to a forward link device of a multicarrier communication system, and in particular, to a forward link device with improved transmission properties of multicarrier information.

2. Description of the Related Art

With the continuing progress of communication technology, the number of subscribers to communication services is increasing considerably. In addition, many methods have been proposed for satisfying the subscribers' demands for increased service quality. One of the proposed methods is to improve a forward link structure.

A 3rd generation multicarrier CDMA (Code Division Multiple Access) system, which is proposed in TIA/EIA TR45.5, includes an improved forward link of a fundamental channel. FIG. 1 illustrates an improved forward link structure of the multicarrier CDMA system.

Referring to FIG. 1, a convolutional encoder and puncturing part (or a channel encoder) 10 encodes input data into symbols. Here, the input data has a variable bit rate. A symbol repetition part 20 repeats the coded data (i.e., symbols) output from the channel encoder 10 to cause the symbols of different rates to have the same symbol rate. An interleaving part 30 interleaves the symbols output from the symbol repetition part 20. For the interleaving part 30, a block interleaver may be used.

A long code generator 91 generates the same long codes as those used in mobile stations. Different long codes are allocated, as identification codes, to the respective subscribers. A decimator 92 decimates the long codes to match the number of the long codes to the number of symbols output from the interleaver part 30. A mixer 93 mixes the output of interleaver 30 with the output of decimator 92.

A demultiplexer 40 demultiplexes in sequence the coded data output from the mixer 93 to multiple carriers A, B and C. First to third binary-to-4-level converters 51–53, respectively, convert binary data output from the demultiplexer 40 to 4-level data. That is, the level converters 51–53 convert 2-level data to 4-level data. First to third Walsh coders 61–63, respectively, orthogonally spread the data output from the first to third binary-to-4-level converters 51–53 with Walsh codes of length 256 for example, respectively. First to third modulators 71–73, respectively, modulate outputs of the first to third Walsh coders 61–63, respectively. For the modulators 71–73, QPSK (Quadrature Phase Shift Keying) spreaders may be used. First to third attenuators 81–83 control gains of the modulation signals output from the first to third modulators 71–73 according to attenuation control signals GA-GC, respectively. Here, the first to third attenuators 81–83 output the multiple carriers A, B and C being different from one another.

In the multicarrier forward link of FIG. 1, the convolutional encoder and channel encoder 10 having a 1/3 coding rate encodes the input data into three convolutionally encoded bits per input data bit, and the coded data (i.e., FEC codes or symbols) are distributed to the three carriers A, B and C after passing through the symbol repetition part 20 and the interleaver part 30. That is, the multicarrier CDMA forward link of FIG. 1 encodes and interleaves the input data, and then transmits the coded data separately through the three carriers after demultiplexing.

FIG. 2 illustrates a detailed structure of the channel encoder 10 (convolutional encoder and puncturing part), the symbol repetition part 20 and the interleaver part 30. In FIG. 2. the input data has a variable rate: data of a first rate is composed of 172 bits (full rate), data of a second rate is composed of 80 bits (1/2 rate), data of a third rate is composed of 40 bits (1/4 rate) and data of a fourth rate is composed of 16 bits (1/8 rate).

Referring to FIG. 2, first to fourth CRC generators 111–114 add corresponding CRC data bits to the input data, respectively. Specifically, the first CRC generator 111 adds 12-bit CRC data to the 172-bit input data of full rate, the second CRC generator 112 adds 8-bit CRC data to the 80-bit input data of 1/2 rate, the third CRC generator 113 adds 6-bit CRC data to the 40-bit input data of 1/4 rate, and the fourth CRC generator 114 adds 6-bit CRC data to the 16-bit input data of 1/8 rate. First to fourth tail bit generators 121–124 add 8 tail bits to the data output from the first to fourth CRC generators 111–114, respectively. As a result, the first tail bit generator 121 outputs 192 bits, the second tail bit generator 122 outputs 96 bits, the third tail bit generator 123 outputs 54 bits, and the fourth tail bit generator 124 outputs 30 bits.

First to fourth encoders 11–14 encode data output from the first to fourth tail bit generators 121–124, respectively. For the first to fourth encoders 11–14, a convolutional encoder having a constraint length (K) 9 and a coding rate (R) 1/3 may be used. In such a case, the first encoder 11 encodes the 192-bit data output from the first tail bit generator 121 into 576 symbols at full rate. The second encoder 12 encodes the 96-bit data output from the second tail bit generator 122 into 288 symbols at 1/2 rate. The third encoder 13 encodes the 54-bit data output frown the third tail bit generator 123 into 162 symbols at 1/4 rate. The fourth encoder 14 encodes the 30-bit data output from the fourth tail bit generator 124 into 90 symbols at 1/8 rate.

To match rates of the symbols output from the second to fourth encoders 12–14 to the rate of the symbols output from the first encoder 11, second to fourth repeaters 22–24 repeat the symbols output from the second to fourth encoders 12–14 predetermined times, respectively, and third and fourth symbol deletion elements 27 and 28 delete the extra symbols exceeding 576 symbols of the full rate. That is, the third and fourth repeaters 23 and 24 repeat input symbols to output the symbols of approximate full rate. The symbol deletion elements 27 and 28 then delete the extra symbols when the number of the repeated symbols exceeds the number of the full rate symbols, so as to adjust the number of the symbols to the same number of the full rate symbols. Specifically, since the second encoder 12 outputs 288 symbols which is half of 576 symbols output from the first encoder 11, the second repeater 22 repeats the input symbols two times to match the number of the symbols to 576. Further, since the third encoder 13 outputs 162 symbols which is about a quarter of the 576 symbols output from the first encoder 11, the third repeater 23 repeats the input symbols four times to adjust the number of the symbols to 648. Here, since 648 symbols are greater in number than 576 full rate symbols, the third deletion element 27 deletes every ninth symbol to adjust the number of the symbols to the full rate symbol number 576. In addition, since the fourth encoder 14 outputs 90 symbols which is about an eighth of 576 symbols output from the first encoder 11, the fourth repeater 24 repeats the input symbols eight times to adjust the number of the symbols to 720. Here, since 720 symbols are greater in number than 576 full rate symbols, the fourth deletion element 28 deletes every fifth symbol to match the number of the symbols to the full rate symbol number 576.

First to fourth interleavers 31–34 interleave the full rate symbols output from the first encoder 11, the second repeater 22, the third symbol deletion element 27 and the fourth symbol deletion element 28, respectively.

As stated above, the symbol repetition is performed when the number of the input symbols is not equal to the number of the full rate symbols. Here, the carriers A, B and C each have a frequency band of 1.2288 MHz (hereinafter referred to as 1.25 MHz for short) which is equal to the frequency bands of three IS-95 channels. The total frequency band for the three carriers A, B and C is 3.6864 MHz which is approximately 5 MHz. This is equal to the total frequency band for the three IS-95 channels.

The forward error correction (FEC) is used to maintain a bit error rate (BER) at the signal receiver side as low as possible with respect to the channels having a low signal-to-noise ratio (SNR) by providing a coding gain to the channels. The forward link of the multicarrier CDMA system may use an overlay scheme which shares the same frequency bands with the existing IS-95 forward link. The overlay method, however, has the following problems.

One of the proposed overlay methods is to overlay three forward link carriers of the multicarrier system on three 1.25 MHz frequency bands used in the IS-95 CDMA system. FIG. 3 illustrates transmission power levels of the base station by the frequency band, for the IS-95 CDMA system and the 3rd generation multicarrier CDMA system. In this overlay scheme, since the frequency bands of the multicarrier system is overlaid on the existing IS-95 frequency bands, the two systems share the transmission power (including the channel capacity) of the base station in the same frequency bands. In the case when the two systems share the transmission power, after the transmission power of the base station is first allocated to the IS-95 channels, the maximum power which can be allocated to the carriers of the multicarrier CDMA system is determined. Here, the maximum power cannot exceed a specific power level, because the transmission power of the base station has limitations. Furthermore, transmitting data to too many subscribers increases interference, causing an increase in noise. FIG. 3 illustrates the state where the transmission powers can be properly allocated to the IS-95 system and the multicarrier system in the respective 1.25 MHz frequency bands. That is to say, FIG. 3 illustrates the state where the transmission powers of the IS-95 system and the multicarrier system are properly distributed.

However, the transmission powers of the IS-95 channels vary according to the change in the number of the subscribers in service and the change in the voice activity of the subscribers. Thus, in the multicarrier system, the transmission powers allocatable to the respective carriers are variable. FIGS. 4 and 5 show that the transmission powers allocatable to the carriers of the multicarrier system are decreased, when the transmission powers allocated to the IS-95 system increase due to an increase in number of the IS-95 subscribers in service. As a result, if one or more carriers of the multiple carriers are not provided with enough transmission power, the respective carriers have significantly different SNR in the mobile station, and a signal received from the carrier with the low SNR will have the higher BER. That is, under the circumstance that there is a large number of the IS-95 subscribers in service and the voice activity of the subscribers is high, the BER of the signal transmitted through the carrier is increased, which results in deterioration of the system performance. In particular, the IS-95 subscribers are more significantly interfered with, rather than in the independent IS-95 environment. The problems which may be caused by the overlay scheme causes the capacity deterioration of the future multicarrier system and an increase in interferences with the IS-95 subscribers.

In the multicarrier system, the three carriers have independent transmission powers, which cause different performance in each channel. FIGS. 4 and 5 illustrate such an example. From the viewpoint of the performance, FIG. 4 shows a performance similar to that of the base station using a 1/2 rate encoder, and FIG. 5 shows a performance which could be more poor than the performance of the base station not using encoding.

As described above, in the multicarrier system using three carriers extending over a 5 MHz frequency band, when 1/3 rate FEC is used, the encoded data (i.e., syboms) are allocated to the carriers by one symbol, for the case of the full rate fundamental channel, so that each carrier transmits different encoded data. In such a case, failure to obtain one or two bits out of the three encoded data at the mobile station due to the carrier degradation causes the deterioration of performance.

SUMMARY OF THE INVENTION

It is therefore an object of the present invention to provide a forward link device capable of improving transmission properties of a communication system with an overlay scheme of an IS-95 system and a multicarrier system, and a method for realizing the same.

It is another object of the present invention to provide a forward link device capable of improving the performance against information loss of the carriers which may be caused by interference in a multicarrier CDMA communication system, and a method for realizing the same.

It is still another object of the present invention to provide a device and method for improving a performance of a forward link by repeating the encoded data by predetermined times and then uniformly distributing the encoded data to respective carriers.

According to one aspect of the present invention, there is provided a forward link device of a multicarrier CDMA communication system with an overlay scheme in which a multicarrier system and an IS-95 system share the same frequency bands. In the forward link device, first to fourth encoders encode input data of corresponding rates with a 1/3 coding rate, respectively. A first repeater repeats two times full rate symbols output from the first encoder, and second to fourth repeaters repeat predetermine times symbols output from the second to fourth encoders, respectively, to match the number of corresponding output symbols to the number of full rate symbols. First to fourth interleavers interleave the symbols output from the first to fourth repeaters, respectively, to uniformly distribute the symbols of the same data bit to the carriers.

According to another aspect of the present invention, there is provided a forward link device of a multicarrier CDMA communication system with an overlay scheme in which a multicarrier system and an IS-95 system share the same frequency bands. In the forward link device, first to fourth encoders encode input data of first to fourth rates with a 1/6 coding rate, respectively. Repeaters repeat predetermined times symbols output from the second to fourth encoders, respectively, to match the number of corresponding output symbols to the number of full rate symbols output from the first encoder. First to fourth interleavers interleave the symbols output from the first encoder and the second to fourth repeaters, respectively, to uniformly distribute the symbols of the same data bit to the carriers.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF PREFERRED EMBODIMENTS

Figure 1:
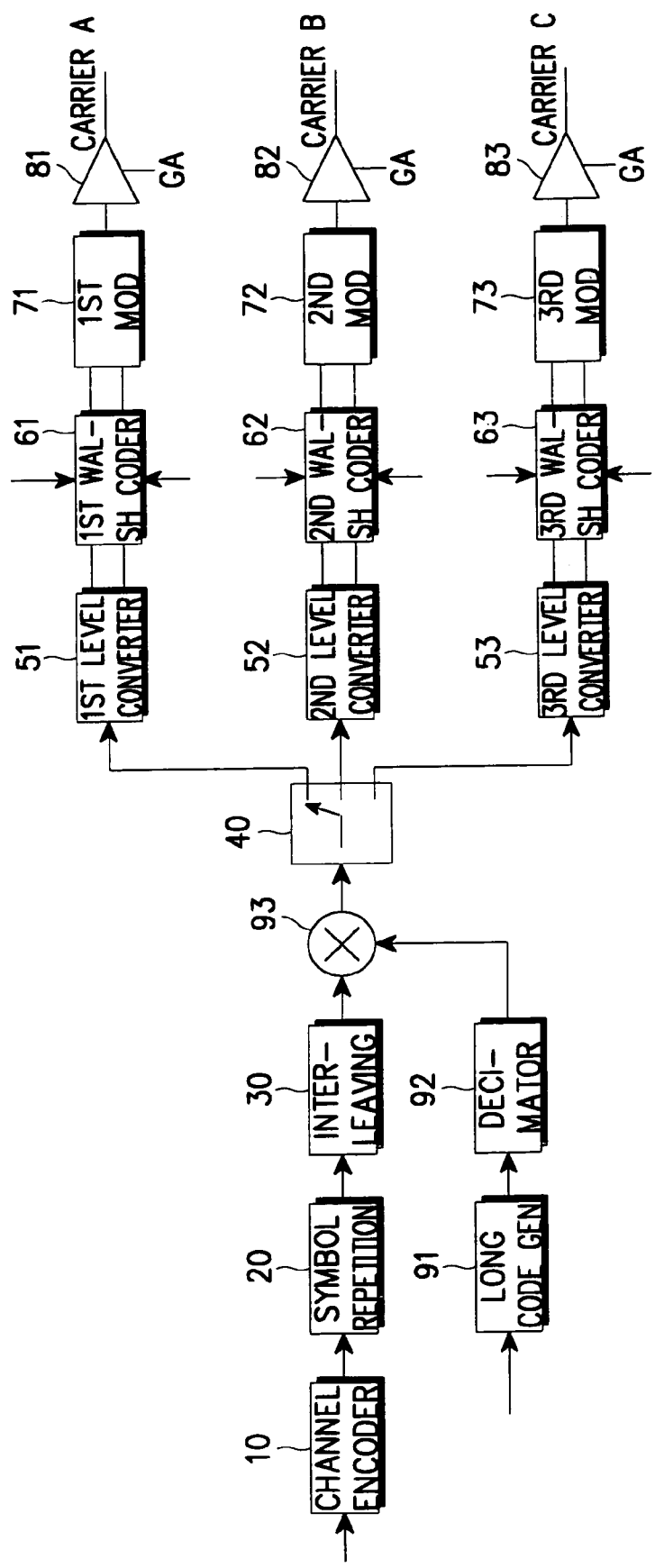
FIG. 1 is a block diagram illustrating a structure of a multicarrier forward link in a CDMA communication system.
Figure 2:
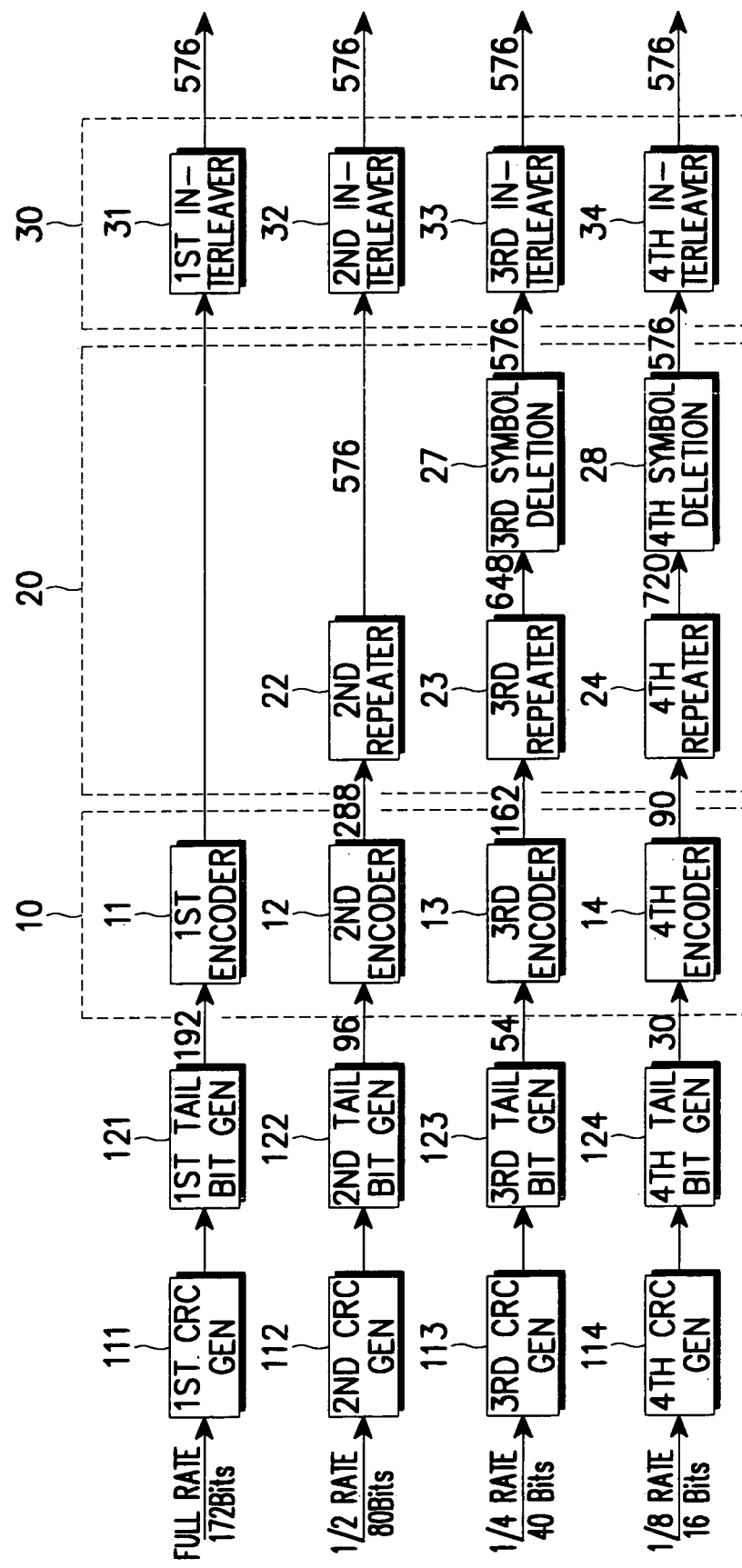
FIG. 2 is a block diagram illustrating a structure of the channel encoder of the multicarrier forward link shown in FIG. 1.
Figure 3:
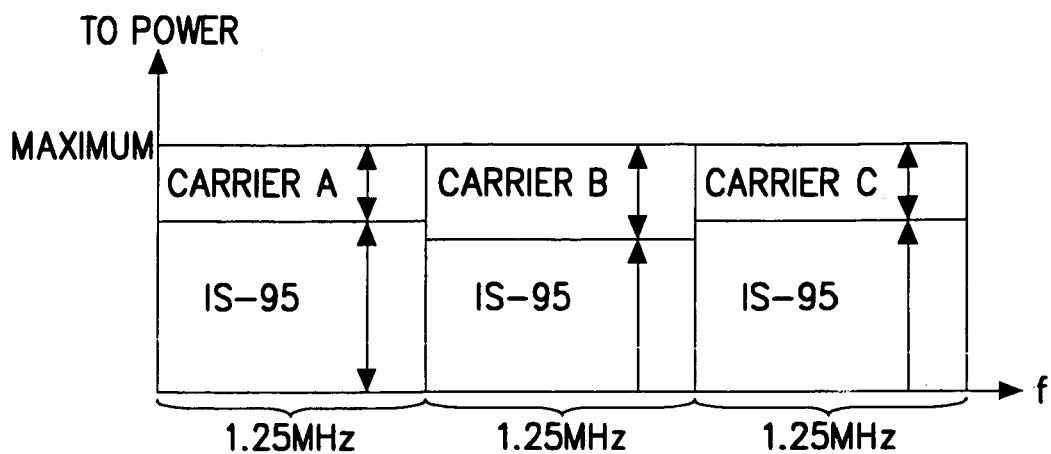
FIG. 3 is a diagram illustrating the transmission power levels of a base station by the frequency bands, when the IS-95 channels and multicarrier channels are overlaid in same frequency bands.

A preferred embodiment of the present invention will be described hereinbelow with reference to the accompanying drawings. In the following description, well known functions or constructions are not described in detail since they would obscure the invention in unnecessary detail.

In a communication system with the overlay scheme according to the present invention, encoded data (i.e., symbols) are uniformly distributed to the respective carriers. The symbols of the same data bits are allocated to as many carriers as possible and at least two symbols for each carrier. Thus, even in the case that one carrier is significantly interfered with, the mobile station processes the coded data transmitted through the other good carriers, thereby improving the performance of the multicarrier forward link.

For example, for the case of the full rate, bits bi,bj (i,j=1,2,3) are generated when 1/3 rate coded data are repeated two times. On the assumption that two bits bi,bj are transmitted to the respective carriers, the forward link should be designed to avoid the case when both of the repeated bits (bi,bj) are transmitted to the same carrier. This can be realized by a specific type of a block interleaver, and such examples are shown in Tables 1 to 6. Furthermore, when using 1/6 rate encoders, it is possible to obtain more improved performance.

In the following description, the term "symbol" refers to the encoded data output from an encoder. The term "rate" refers to a data rate of input data and four data rates are used in the embodiment. Further, the term "coding rate" refers to a coding rate with which the encoder encodes the input data into symbols.

In addition, the term "symbols of the same data bit" refers to the encoded data symbols from the same input data bit, output from an encoder and/or a repeater. For example, when an encoder has a 1/3 coding rate and a symbol repeater repeats input symbols 2 times, the encoder encodes the input data bit into three encoded data symbols and the repeater repeats the three symbols two times, thus outputting 6 symbols. In this case, there are 6 symbols for the same data bit. Even for the case of the full rate where the encoder has a 1/6 coding rate and the repeater is not used, there exist 6 symbols for the same data bit.

Further, a term "uniform" refers to the state where the symbols for the same data bit are uniformly distributed to the carriers by the symbols (determined by the number symbols of the same data bit/the number of the carriers).

In a multicarrier system using three carriers, the "uniform distribution" means that when there are 6 symbols for the same data bit, the symbols are uniformly distributed to the respective carriers by two symbols which are not replicas of each other in most cases. Alternatively, when there are 23 symbols for the same data bit, the symbols are uniformly distributed to the respective carriers by at least 7 symbols. In addition, when the symbols distributed to the respective carriers are ba, bb, bc, bd, . . . , it is preferable to avoid overlapping of the symbols.

Figure 6:
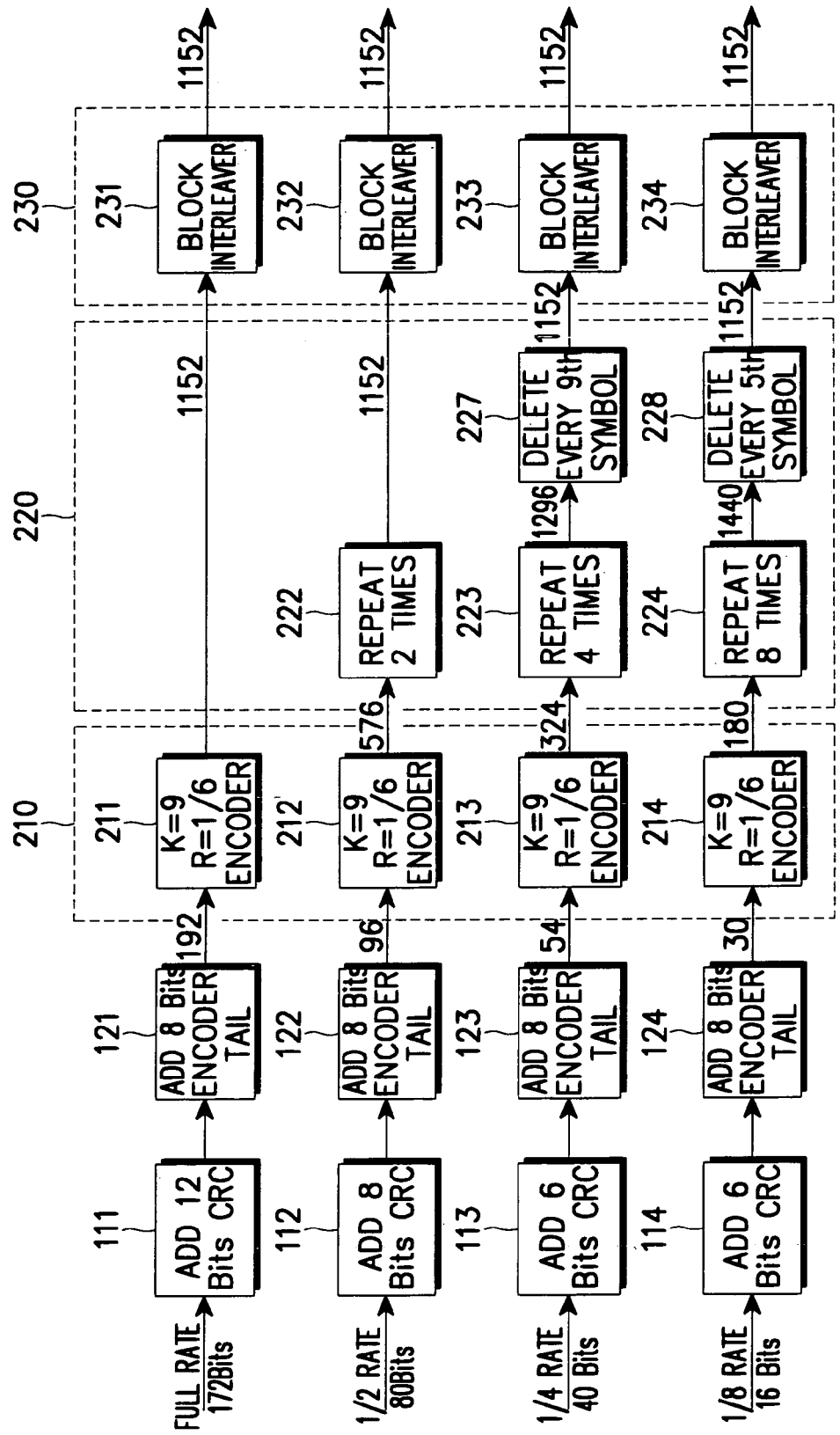
FIG. 6 is a block diagram illustrating a structure of a multicarrier forward link of a CDMA communication system according to an embodiment of the present invention.
Figure 7:
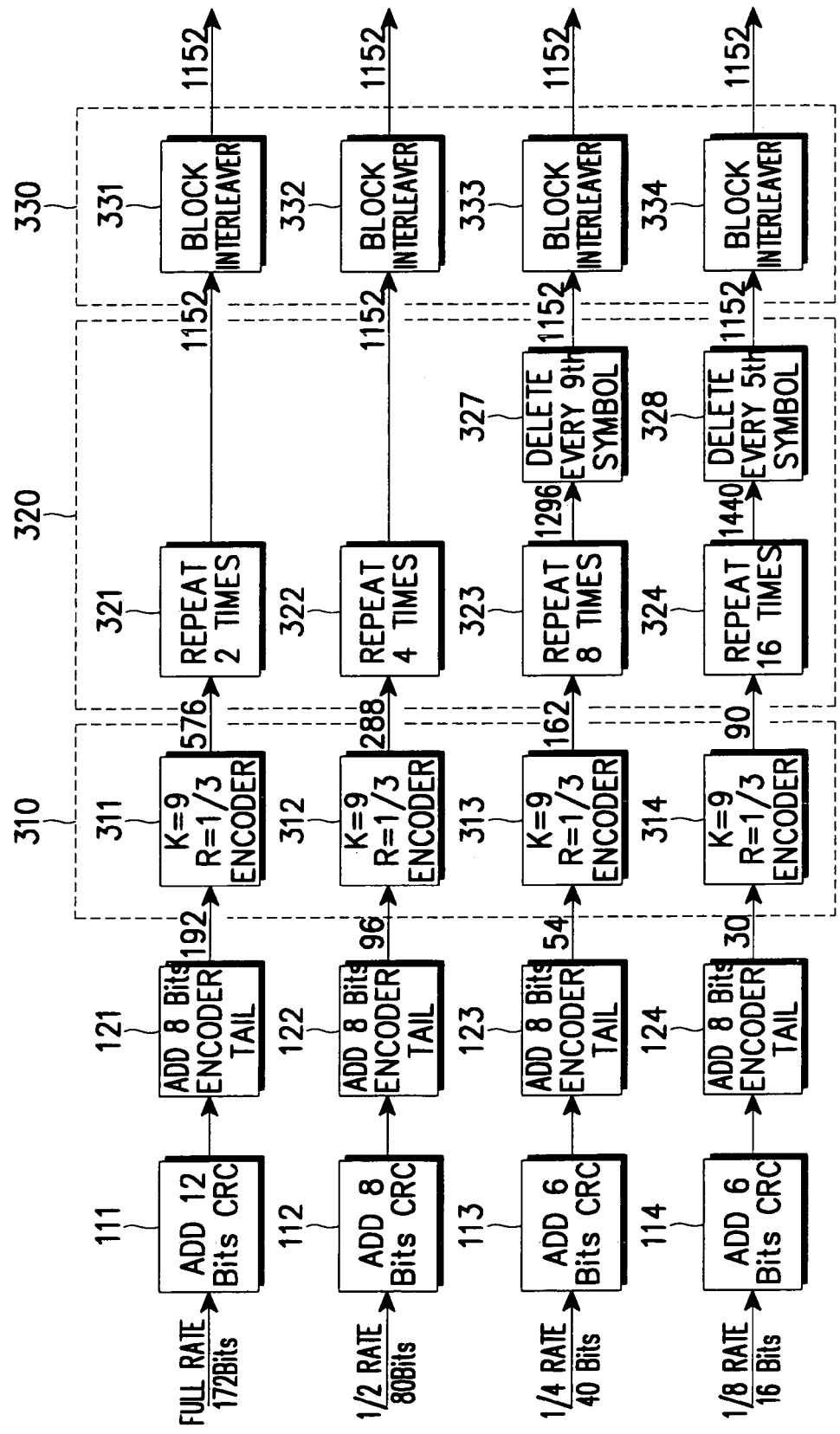
FIG. 7 is a block diagram illustrating a structure of a multicarrier forward link of a CDMA communication system according to another embodiment of the present invention.

FIG. 6 illustrates a structure of an improved forward link by adjusting the coding rate of the channel encoder 10 of FIG. 1, and FIG. 7 illustrates a structure of an improved forward link by adjusting the repetition times of the symbol repetition part 20 of FIG. 1.

Referring to FIG. 6, a multicarrier CDMA forward link according to an embodiment of the present invention has the same structure as that of FIG. 1, except for encoder part 210 and interleaver part 230. In the forward link structure of FIG. 6, three carriers are used, and the encoder part 210 has a 1/6 coding rate. Further, full rate data is composed of 172 bits, and there are four different data rates. It should be, however, noted that the number of carriers, the coding rate and the number of data rates can be modified within the scope of the invention.

In FIG. 6, first to fourth CRC generators 111–114 add corresponding CRC bits to input data, respectively. Specifically, the first CRC generator 111 adds 12 CRC bits to 172-bit input data of full rate, the second CRC generator 112 adds 8 CRC bits to 80-bit input data of 1/2 rate, the third CRC generator 113 adds 6 CRC bits to 40-bit input data of 1/4 rate, and the fourth CRC generator 114 adds 6 CRC bits to 16-bit input data of 1/8 rate.

First to fourth tail bit generators 121–124 add 8 tail bits to outputs of the first to fourth CRC generators 111–114, respectively. Therefore, the first tail bit generator 121 outputs 192 bits, the second tail bit generator 122 outputs 96 bits, the third tail bit generator 123 outputs 54 bits and the fourth tail bit generator 124 outputs 30 bits.

First to fourth encoders 211–214 encode the data output from the first to fourth tail bit generators 121–124, respectively. For the first to fourth encoders 211–214, a K=9, R=1/6 convolutional encoder may be used. In such a case, the first encoder 211 encodes 192-bit data output from the first tail bit generator 121 into 1152 full rate symbols. The second encoder 212 encodes 96-bit data output from the second tail bit generator 122 into 576 symbols of 1/2 rate. The third encoder 213 encodes 54-bit data output from the third tail bit generator 123 into 324 symbols of 1/4 rate. The fourth encoder 214 encodes 30-bit data output from the fourth tail bit generator 124 into 180 symbols of 1/8 rate.

Second to fourth repeaters 222–224 repeat the symbols input from the second to fourth encoders 212–214 predetermined times, respectively, to match the number of the symbols to the number of the full rate symbols. Third and fourth symbol deletion elements 227 and 228 delete the extra symbols which are repeated in the third and fourth repeaters 223 and 224 exceeding the number of the full rate symbols, respectively. That is, the second to fourth repeaters 222–224 repeat the input symbols to the approximate number of the full rate symbols, and the symbol deletion elements 227–228 delete the symbols exceeding the number of the full rate symbols to adjust the number of the symbols to the full rate symbol number. Specifically, since the second encoder 212 outputs 576 symbols which is half of 1152 symbols output from the first encoder 211, the second repeater 222 repeats the input symbols two times to output 1152 full rate symbols. Since the third encoder 213 outputs 324 symbols which is about a quarter of 1152 symbols output from the first encoder 211, the third repeater 223 repeats the input symbols four times to output 1296 symbols. Here, since 1296 symbols are greater in number than 1152 ful 1 rate symbols, the third symbol deletion element 227 deletes every ninth symbol to adjust the number of the symbols to 1152 of the full rate symbol number. Further, since the fourth encoder 214 outputs 180 symbols which is about an eighth of 1152 symbols output from the first encoder 211, the fourth repeater 224 repeats the input symbols eight times to output 1440 symbols. Here, since 1440 symbols are greater in number than 1152 full rate symbols, the fourth symbol deletion element 228 deletes every fifth symbol to adjust the number of the symbols to 1152 of the full rate symbol number.

First to fourth interleavers 231–234 interleave 1152 symbols output from the first encoder 211, the second repeater 222, the third symbol deletion element 227 and the fourth symbol deletion element 228, respectively, and uniformly distribute the symbols of the same data bit to the carriers. The first to fourth interleavers 231–234 should satisfy the condition that the symbols of the same data bit are uniformly distributed to the carriers. For the first to fourth interleavers 231–234, a block interleaver or a random interleaver may be used. In this case, a specific block interleaver is required, in order to uniformly distribute the symbols of the same data bit to the respective carriers. Examples are shown in Tables 1 to 6. In these interleavers, the symbols of the same data bit are optimally and uniformly distributed to the respective carriers.

In FIG. 6, when using 1/6 rate FEC, the first to fourth encoders 211–214 encode each input data bit into 6 symbols, respectively, and the first to fourth interleavers 231–234 uniformly distribute the symbols to the carriers. In such a case, even for the full rate, the symbols of the same data bit are uniformly distributed to the carriers and then transmitted. Therefore, even when it is difficult to demodulate the received data due to interference with a specific carrier, the mobile station can process the data received through the other good carriers, thereby improving the transmission performance.

That is, in the multicarrier system using three carriers extending over a 5 MHz frequency band, when the 1/6 rate encoders are used, the first encoder 211 outputs 6 symbols for the same data bit and the first interleaver 231 uniformly distributes the symbols to the respective carriers by 2 symbols. The second repeater 222 outputs 12 symbols of the same data bit and the second interleaver 232 uniformly distributes the symbols to the respective carriers by 4 symbols. The third symbol deletion element 227 outputs 23 or 24 symbols of the same data bit and the third interleaver 233 uniformly distributes the symbols to the respective carriers by at least 7 symbols. Finally, the fourth symbol deletion element 228 outputs 47 or 48 symbols of the same data bit and the fourth interleaver 234 uniformly distributes the symbols to the respective carriers by at least 15 symbols.

Figure 4:
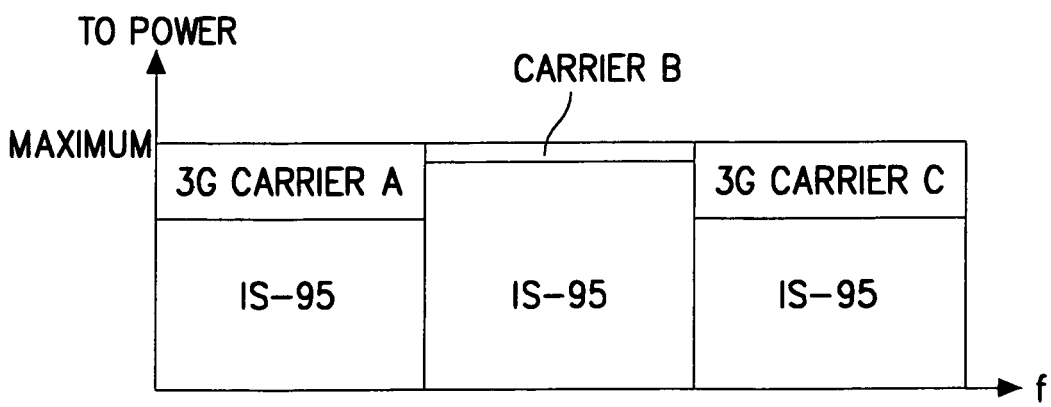
FIG. 4 is a diagram for showing that when the power level of a specific IS95 channel increases, a carrier of the corresponding multicarrier channel has relatively low transmission power due to transmission power limit or a transmission capacity limit of the system at the specific frequency band.
Figure 5:
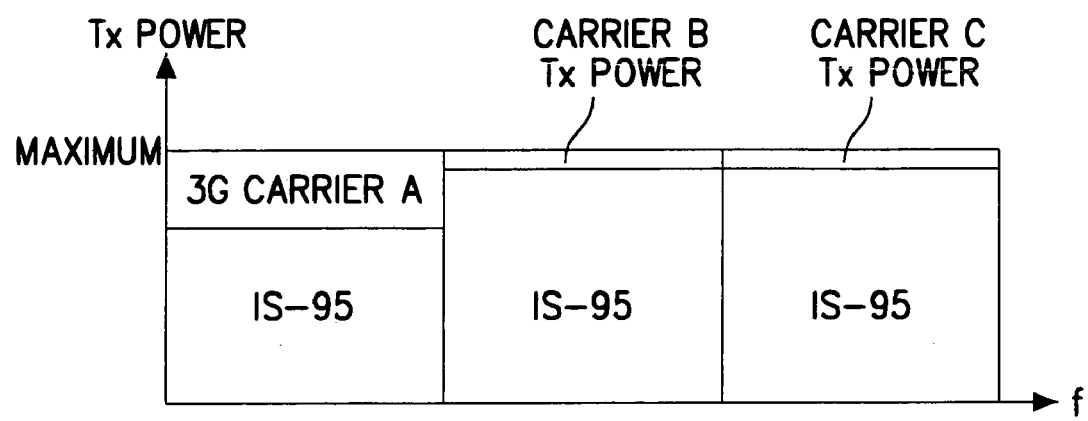
FIG. 5 is a diagram for showing another example of FIG. 4.

In this case, if information is received from only two carriers as shown in FIG. 4, the mobile station may have a similar performance of that with a 1/4 rate FEC. Furthermore, in the worst case, even if information is received from only one carrier as shown in FIG. 5, the mobile station has a similar performance of that with a 12 rate FEC. Accordingly, by using the forward link structure of FIG. 6, the system can transmit data even if at least one carrier is normal, thereby improving the forward link performance of the system.

Referring to FIG. 7, a multicarrier CDMA forward link according to another embodiment of the present invention has the same structure as that of FIG. 1, except for symbol repetition part 320 and interleaver part 330. In the forward link structure of FIG. 7, three carriers are used, and the encoder part 310 has a 1/3 coding rate. Furthermore, full rate data is composed of 172 bits, there are four different data rates, and the number of repetition times is twice the number of repetition times in the IS-95 system. It should be noted, however, that the number of the carriers, the coding rate and the number of the data rates can be modified within the scope of the invention.

In FIG. 7, first to fourth CRC generators 111–114 add corresponding CRC bits to input data, respectively. Specifically, the first CRC generator 111 adds 12 CRC bits to 172-bit input data of full rate, the second CRC generator 112 adds 8 CRC bits to 80-bit input data of 1/2 rate, the third CRC generator 113 adds 6 CRC bits to 40-bit input data of 1/4 rate, and the fourth CRC generator 114 adds 6 CRC bits to 16-bit input data of 1/8 rate.

First to fourth tail bit generators 121–124 add 8 tail bits to the outputs of the first to fourth CRC generators 111–114, respectively. Therefore, the first tail bit generator 121 outputs 192 bits, the second tail bit generator 122 outputs 96 bits, the third tail bit generator 123 outputs 54 bits and the fourth tail bit generator 124 outputs 30 bits.

First to fourth encoders 311–314 encode the data output from the first to fourth tail bit generators 121–124, respectively. For the first to fourth encoders 311–314, a K=9, R=1/3 convolutional encoder may be used. In such a case, the first encoder 311 encodes 192-bit data output from the first tail bit generator 121 into 576 full rate symbols. The second encoder 312 encodes 96-bit data output from the second tail bit generator 122 into 288 symbols of 1/2 rate. The third encoder 313 encodes 54-bit data output from the third tail bit generator 123 into 162 symbols of 1/4 rate. The fourth encoder 314 encodes 30-bit data output from the fourth tail bit generator 124 into 90 symbols of 1/8 rate.

A first repeater 321 repeats two times 576 symbols output from the first encoder 311 and outputs 1152 symbols to uniformly distribute the symbols of the same data bit to the respective carriers by two symbols. Second to fourth repeaters 322–324 repeat predetermined times the input symbols from the second to fourth encoders 312–314, respectively, to adjust the number of the symbols to the number of the full rate symbols.

Third and fourth symbol deletion elements 327 and 328 delete the extra symbols which are repeated in the third and fourth repeaters 323 and 324 exceeding the number of the full rate symbols, respectively. That is, the second to fourth repeaters 322–324 repeat the input symbols to the approximate number of the full rate symbols, and the symbol deletion elements 327–328 delete the symbols exceeding the number of the full rate symbols to adjust the number of the symbols to the full rate symbol number. Specifically, since the second encoder 312 outputs 288 symbols which is half of 576 symbols output from the first encoder 311, the second repeater 322 repeats the input symbols four times to output 1152 symbols. Since the third encoder 313 outputs 162 symbols which is about a quarter of 576 symbols output from the first encoder 311, the third repeater 323 repeats the input symbols eight times to output 1296 symbols. Here, since 1296 symbols are greater in number than 1152 full rate symbols, the third symbol deletion element 327 deletes every ninth symbol to adjust the number of the symbols to 1152 of the full rate symbol number. Further, since the fourth encoder 314 outputs 90 symbols which is about an eighth of 576 symbols output from the first encoder 311, the fourth repeater 324 repeats the input symbols sixteen times to output 1440 symbols. Here, since 1440 symbols are greater in number than 1152 full rate symbols, the fourth symbol deletion element 328 deletes every fifth symbol to adjust the number of the symbols to 1152 of full rate symbol number.

First to fourth interleavers 331–334 interleave 1152 symbols output from the first repeater 321, the second repeater 322, the third symbol deletion element 327 and the fourth symbol deletion element 328, respectively, and uniformly distribute the symbols of the same data bit to the respective carriers. The first to fourth interleavers 331–334 should satisfy the condition that the symbols of the same data bit are uniformly distributed to the respective carriers. For the first to fourth interleavers 331–334, a block interleaver or a random interleaver may be used. In this case, a specific block interleaver is required, in order to uniformly distribute the symbols of the same data bit to the respective carriers without overlapping of the symbols of the same data bits. Examples are shown in Tables 1 to 6.

In FIG. 7, when using 1/3 rate FEC, the first to fourth encoders 311–314 encode each input data bit into 3 symbols in encoding the input data, respectively. In this embodiment, each input data bit is encoded into three symbols and then repeated to uniformly distribute the symbols of the same data bit to the respective carriers. In this case, even for the full rate, the same symbols are uniformly distributed to the respective carriers and then transmitted. Therefore, even in the case that it is difficult to demodulate the received data due to interference with a specific carrier, the mobile station can process the data received through the other good carriers, thereby improving the transmission performance.

For example, in the multicarrier system using three carriers extending over 5 K1 Hz frequency band, when 1/3 rate encoders are used, 1/3 rate coded bits b 1.b2,b3 are repeated to make bi,bj (where i,j=1,2,3) for the full rate. In the case that two bits bi,bj are transmitted to the respective carriers, the system should be designed to avoid the case when a carrier transmits bi,bj (i=j). That is, the first encoder 311 outputs 3 symbols of the same data bit, the first repeater 321 outputs 6 symbols of the same data bit, and the first interleaver 331 uniformly distributes the symbols to the respective carriers by 2 symbols. The second repeater 322 outputs 12 symbols of the same data bit and the second interleaver 332 uniformly distributes the symbols to the respective carriers by 4 symbols. The third symbol deletion element 327 outputs 23 or 24 symbols of the same data and the third interleaver 333 uniformly distributes the symbols to the respective carriers by at least 7 symbols. Finally, the fourth symbol deletion element 328 outputs 47 or 48 symbols of the same data bit and the fourth interleaver 334 uniformly distributes these symbols to the respective carriers by at least 15 symbols.

Accordingly, if information is received from only two carriers as shown in FIG. 4, the mobile station may have a similar performance of that with a 1/4 rate FEC. Furthermore, in the worst case, even if information is received from only one carrier as shown in FIG. 5, the mobile station has a similar performance of that with a 1 rate FEC. Accordingly, with use of the forward link structure of FIG. 7, the system can transmit data even if at least one carrier is normal, thereby improving the forward link performance of the system.

Tables 1 to 6 illustrate an example of uniformly distributing 1/3 rate coded data to the carriers according to the block interleaver in the present invention, in which the input data of full rate is composed of 172 bits. Specifically, Table 1 illustrates the arrangement of the symbols output from the first encoder 311 which encodes the full rate input data. Table 2 illustrates the arrangement of the symbols output from the first repeater 321 which repeats the symbols of Table 1 two times. Table 3 illustrates the arrangement of the symbols adjusted in the first interleaver 331 to uniformly distribute the symbols of the same data to the carriers, in distributing the symbols of Table 2 output from the first repeater 321 to the carriers A, B and C. Table 4 illustrates the arrangement of the symbols distributed to the carrier A in the first interleaver 331, Table 5 illustrates arrangement of the symbols distributed to the carrier B in the first interleaver 331, and Table 6 illustrates arrangement of the symbols distributed to the carrier C in the first interleaver 331. As illustrated in Tables 4 to 6, it can be understood that the first interleaver 331 uniformly distributes the symbols of the same data bit to the carriers by two symbols, in distributing the symbols to the carriers

TABLE 1

(Arrangement of Coded Symbols: 18*32)

|  | 1 | 19 | 37 | 55 | 73 | 91 | 109 | 127 | 145 | 163 | 181 | 199 | 217 | 235 | 253 | 271 |
|---|---|---|---|---|---|---|---|---|---|---|---|---|---|---|---|---|
| 289 | 307 | 325 | 343 | 361 | 379 | 397 | 415 | 433 | 451 | 469 | 487 | 505 | 523 | 541 | 559 |  |
|  | 2 | 20 | 38 | 56 | 74 | 92 | 110 | 128 | 146 | 164 | 182 | 200 | 218 | 236 | 254 | 272 |
| 290 | 308 | 326 | 344 | 362 | 380 | 398 | 416 | 434 | 452 | 470 | 488 | 506 | 524 | 542 | 560 |  |
|  | 3 | 21 | 39 | 57 | 75 | 93 | 111 | 129 | 147 | 165 | 183 | 201 | 219 | 237 | 255 | 273 |
| 291 | 309 | 327 | 345 | 363 | 381 | 399 | 417 | 435 | 453 | 471 | 489 | 507 | 525 | 543 | 561 |  |
|  | 4 | 22 | 40 | 58 | 76 | 94 | 112 | 130 | 148 | 166 | 184 | 202 | 220 | 238 | 256 | 274 |
| 292 | 310 | 328 | 346 | 364 | 382 | 400 | 418 | 436 | 454 | 472 | 490 | 508 | 526 | 544 | 562 |  |
|  | 5 | 23 | 41 | 59 | 77 | 95 | 113 | 131 | 149 | 167 | 185 | 203 | 221 | 239 | 257 | 275 |
| 293 | 311 | 329 | 347 | 365 | 383 | 401 | 419 | 437 | 455 | 473 | 491 | 509 | 527 | 545 | 563 |  |

TABLE 1-continued (Arrangement of Coded Symbols: 18*32)

|     | 6   | 24  | 42  | 60  | 78  | 96  | 114 | 132 | 150 | 168 | 186 | 204 | 222 | 240 | 258 | 276 |
|-----|-----|-----|-----|-----|-----|-----|-----|-----|-----|-----|-----|-----|-----|-----|-----|-----|
| 294 | 312 | 330 | 348 | 366 | 384 | 402 | 420 | 438 | 456 | 474 | 492 | 510 | 528 | 546 | 564 |     |
|     | 7   | 25  | 43  | 61  | 79  | 97  | 115 | 133 | 151 | 169 | 187 | 205 | 223 | 241 | 259 | 277 |
| 295 | 313 | 331 | 349 | 367 | 385 | 403 | 421 | 439 | 457 | 475 | 493 | 511 | 529 | 547 | 565 |     |
|     | 8   | 26  | 44  | 62  | 80  | 98  | 116 | 134 | 152 | 170 | 188 | 206 | 224 | 242 | 260 | 278 |
| 296 | 314 | 332 | 350 | 368 | 386 | 404 | 422 | 440 | 458 | 476 | 494 | 512 | 530 | 548 | 566 |     |
|     | 9   | 27  | 45  | 63  | 81  | 99  | 117 | 135 | 153 | 171 | 189 | 207 | 225 | 243 | 261 | 279 |
| 297 | 315 | 333 | 351 | 369 | 387 | 405 | 423 | 441 | 459 | 477 | 495 | 513 | 531 | 549 | 567 |     |
|     | 10  | 28  | 46  | 64  | 82  | 100 | 118 | 136 | 154 | 172 | 190 | 208 | 226 | 244 | 262 |     |
| 280 | 298 | 316 | 334 | 352 | 370 | 388 | 406 | 424 | 442 | 460 | 478 | 496 | 514 | 532 | 550 |     |
| 568 |     |     |     |     |     |     |     |     |     |     |     |     |     |     |     |     |
|     | 11  | 29  | 47  | 65  | 83  | 101 | 119 | 137 | 155 | 173 | 191 | 209 | 227 | 245 | 263 |     |
| 281 | 299 | 317 | 335 | 353 | 371 | 389 | 407 | 425 | 443 | 461 | 479 | 497 | 515 | 533 | 551 |     |
| 569 |     |     |     |     |     |     |     |     |     |     |     |     |     |     |     |     |
|     | 12  | 30  | 48  | 66  | 84  | 102 | 120 | 138 | 156 | 174 | 192 | 210 | 228 | 246 | 264 |     |
| 282 | 300 | 318 | 336 | 354 | 372 | 390 | 408 | 426 | 444 | 462 | 480 | 498 | 516 | 534 | 552 |     |
| 570 |     |     |     |     |     |     |     |     |     |     |     |     |     |     |     |     |
|     | 13  | 31  | 49  | 67  | 85  | 103 | 121 | 139 | 157 | 175 | 193 | 211 | 229 | 247 | 265 |     |
| 283 | 301 | 319 | 337 | 355 | 373 | 391 | 409 | 427 | 445 | 463 | 481 | 499 | 517 | 535 | 553 |     |
| 571 |     |     |     |     |     |     |     |     |     |     |     |     |     |     |     |     |
|     | 14  | 32  | 50  | 68  | 86  | 104 | 122 | 140 | 158 | 176 | 194 | 212 | 230 | 248 | 266 |     |
| 284 | 302 | 320 | 338 | 356 | 374 | 392 | 410 | 428 | 446 | 464 | 482 | 500 | 518 | 536 | 554 |     |
| 572 |     |     |     |     |     |     |     |     |     |     |     |     |     |     |     |     |
|     | 15  | 33  | 51  | 69  | 87  | 105 | 123 | 141 | 159 | 177 | 195 | 213 | 231 | 249 | 267 |     |
| 285 | 303 | 321 | 339 | 357 | 375 | 393 | 411 | 429 | 447 | 465 | 483 | 501 | 519 | 537 | 555 |     |
| 573 |     |     |     |     |     |     |     |     |     |     |     |     |     |     |     |     |
|     | 16  | 34  | 52  | 70  | 88  | 106 | 124 | 142 | 160 | 178 | 196 | 214 | 232 | 250 | 268 |     |
| 286 | 304 | 322 | 340 | 358 | 376 | 394 | 412 | 430 | 448 | 466 | 484 | 502 | 520 | 538 | 556 |     |
| 574 |     |     |     |     |     |     |     |     |     |     |     |     |     |     |     |     |
|     | 17  | 35  | 53  | 71  | 89  | 107 | 125 | 143 | 161 | 179 | 197 | 215 | 233 | 251 | 269 |     |
| 287 | 305 | 323 | 341 | 359 | 377 | 395 | 413 | 431 | 449 | 467 | 485 | 503 | 521 | 539 | 557 |     |
| 575 |     |     |     |     |     |     |     |     |     |     |     |     |     |     |     |     |
|     | 18  | 36  | 54  | 72  | 90  | 108 | 126 | 144 | 162 | 180 | 198 | 216 | 234 | 252 | 270 |     |
| 288 | 306 | 324 | 342 | 360 | 378 | 396 | 414 | 432 | 450 | 468 | 486 | 504 | 522 | 540 | 558 |     |
| 576 |     |     |     |     |     |     |     |     |     |     |     |     |     |     |     |     |

TABLE 2

(Symbol Arrangement after Repetition (2 Times): 36*32)

|     | 1   | 19  | 37  | 55  | 73  | 91  | 109 | 127 | 145 | 163 | 181 | 199 | 217 | 235 | 253 | 271 |
|-----|-----|-----|-----|-----|-----|-----|-----|-----|-----|-----|-----|-----|-----|-----|-----|-----|
| 289 | 307 | 325 | 343 | 361 | 379 | 397 | 415 | 433 | 451 | 469 | 487 | 505 | 523 | 541 | 559 |     |
|     | 1   | 19  | 37  | 55  | 73  | 91  | 109 | 127 | 145 | 163 | 181 | 199 | 217 | 235 | 253 | 271 |
| 289 | 307 | 325 | 343 | 361 | 379 | 397 | 415 | 433 | 451 | 469 | 487 | 505 | 523 | 541 | 559 |     |
|     | 2   | 20  | 38  | 56  | 74  | 92  | 110 | 128 | 146 | 164 | 182 | 200 | 218 | 236 | 254 | 272 |
| 290 | 308 | 326 | 344 | 362 | 380 | 398 | 416 | 434 | 452 | 470 | 488 | 506 | 524 | 542 | 560 |     |
|     | 2   | 20  | 38  | 56  | 74  | 92  | 110 | 128 | 146 | 164 | 182 | 200 | 218 | 236 | 254 | 272 |
| 290 | 308 | 326 | 344 | 362 | 380 | 398 | 416 | 434 | 452 | 470 | 488 | 506 | 524 | 542 | 560 |     |
|     | 3   | 21  | 39  | 57  | 75  | 93  | 111 | 129 | 147 | 165 | 183 | 201 | 219 | 237 | 255 | 273 |
| 291 | 309 | 327 | 345 | 363 | 381 | 399 | 417 | 435 | 453 | 471 | 489 | 507 | 525 | 543 | 561 |     |
|     | 3   | 21  | 39  | 57  | 75  | 93  | 111 | 129 | 147 | 165 | 183 | 201 | 219 | 237 | 255 | 273 |
| 291 | 309 | 327 | 345 | 363 | 381 | 399 | 417 | 435 | 453 | 471 | 489 | 507 | 525 | 543 | 561 |     |
|     | 4   | 22  | 40  | 58  | 76  | 94  | 112 | 130 | 148 | 166 | 184 | 202 | 220 | 238 | 256 | 274 |
| 292 | 310 | 328 | 346 | 364 | 382 | 400 | 418 | 436 | 454 | 472 | 490 | 508 | 526 | 544 | 562 |     |
|     | 4   | 22  | 40  | 58  | 76  | 94  | 112 | 130 | 148 | 166 | 184 | 202 | 220 | 238 | 256 | 274 |
| 292 | 310 | 328 | 346 | 364 | 382 | 400 | 418 | 436 | 454 | 472 | 490 | 508 | 526 | 544 | 562 |     |
|     | 5   | 23  | 41  | 59  | 77  | 95  | 113 | 131 | 149 | 167 | 185 | 203 | 221 | 239 | 257 | 275 |
| 293 | 311 | 329 | 347 | 365 | 383 | 401 | 419 | 437 | 455 | 473 | 491 | 509 | 527 | 545 | 563 |     |
|     | 5   | 23  | 41  | 59  | 77  | 95  | 113 | 131 | 149 | 167 | 185 | 203 | 221 | 239 | 257 | 275 |
| 293 | 311 | 329 | 347 | 365 | 383 | 401 | 419 | 437 | 455 | 473 | 491 | 509 | 527 | 545 | 563 |     |
|     | 6   | 24  | 42  | 60  | 78  | 96  | 114 | 132 | 150 | 168 | 186 | 204 | 222 | 240 | 258 | 276 |
| 294 | 312 | 330 | 348 | 366 | 384 | 402 | 420 | 438 | 456 | 474 | 492 | 510 | 528 | 546 | 564 |     |
|     | 6   | 24  | 42  | 60  | 78  | 96  | 114 | 132 | 150 | 168 | 186 | 204 | 222 | 240 | 258 | 276 |
| 294 | 312 | 330 | 348 | 366 | 384 | 402 | 420 | 438 | 456 | 474 | 492 | 510 | 528 | 546 | 564 |     |
|     | 7   | 25  | 43  | 61  | 79  | 97  | 115 | 133 | 151 | 169 | 187 | 205 | 223 | 241 | 259 | 277 |
| 295 | 313 | 331 | 349 | 367 | 385 | 403 | 421 | 439 | 457 | 475 | 493 | 511 | 529 | 547 | 565 |     |
|     | 7   | 25  | 43  | 61  | 79  | 97  | 115 | 133 | 151 | 169 | 187 | 205 | 223 | 241 | 259 | 277 |
| 295 | 313 | 331 | 349 | 367 | 385 | 403 | 421 | 439 | 457 | 475 | 493 | 511 | 529 | 547 | 565 |     |
|     | 8   | 26  | 44  | 62  | 80  | 98  | 116 | 134 | 152 | 170 | 188 | 206 | 224 | 242 | 260 | 278 |
| 296 | 314 | 332 | 350 | 368 | 386 | 404 | 422 | 440 | 458 | 476 | 494 | 512 | 530 | 548 | 566 |     |
|     | 8   | 26  | 44  | 62  | 80  | 98  | 116 | 134 | 152 | 170 | 188 | 206 | 224 | 242 | 260 | 278 |
| 296 | 314 | 332 | 350 | 368 | 386 | 404 | 422 | 440 | 458 | 476 | 494 | 512 | 530 | 548 | 566 |     |
|     | 9   | 27  | 45  | 63  | 81  | 99  | 117 | 135 | 153 | 171 | 189 | 207 | 225 | 243 | 261 | 279 |
| 297 | 315 | 333 | 351 | 369 | 387 | 405 | 423 | 441 | 459 | 477 | 495 | 513 | 531 | 549 | 567 |     |

TABLE 2-continued (Symbol Arrangement after Repetition (2 Times): 36*32)

| | 9 | 27 | 45 | 63 | 81 | 99 | 117 | 135 | 153 | 171 | 189 | 207 | 225 | 243 | 261 | 279 |
|---|---|---|---|---|---|---|---|---|---|---|---|---|---|---|---|---|
| 297 | 315 | 333 | 351 | 369 | 387 | 405 | 423 | 441 | 459 | 477 | 495 | 513 | 531 | 549 | 567 | |
| | 10 | 28 | 46 | 64 | 82 | 100 | 118 | 136 | 154 | 172 | 190 | 208 | 226 | 244 | 262 | |
| 280 | 298 | 316 | 334 | 352 | 370 | 388 | 406 | 424 | 442 | 460 | 478 | 496 | 514 | 532 | 550 | |
| 568 | | | | | | | | | | | | | | | | |
| | 10 | 28 | 46 | 64 | 82 | 100 | 118 | 136 | 154 | 172 | 190 | 208 | 226 | 244 | 262 | |
| 280 | 298 | 316 | 334 | 352 | 370 | 388 | 406 | 424 | 442 | 460 | 478 | 496 | 514 | 532 | 550 | |
| 568 | | | | | | | | | | | | | | | | |
| | 11 | 29 | 47 | 65 | 83 | 101 | 119 | 137 | 155 | 173 | 191 | 209 | 227 | 245 | 263 | |
| 281 | 299 | 317 | 335 | 353 | 371 | 389 | 407 | 425 | 443 | 461 | 479 | 497 | 515 | 533 | 551 | |
| 569 | | | | | | | | | | | | | | | | |
| | 11 | 29 | 47 | 65 | 83 | 101 | 119 | 137 | 155 | 173 | 191 | 209 | 227 | 245 | 263 | |
| 281 | 299 | 317 | 335 | 353 | 371 | 389 | 407 | 425 | 443 | 461 | 479 | 497 | 515 | 533 | 551 | |
| 569 | | | | | | | | | | | | | | | | |
| | 12 | 30 | 48 | 66 | 84 | 102 | 120 | 138 | 156 | 174 | 192 | 210 | 228 | 246 | 264 | |
| 282 | 300 | 318 | 336 | 354 | 372 | 390 | 408 | 426 | 444 | 462 | 480 | 498 | 516 | 534 | 552 | |
| 570 | | | | | | | | | | | | | | | | |
| | 12 | 30 | 48 | 66 | 84 | 102 | 120 | 138 | 156 | 174 | 192 | 210 | 228 | 246 | 264 | |
| 282 | 300 | 318 | 336 | 354 | 372 | 390 | 408 | 426 | 444 | 462 | 480 | 498 | 516 | 534 | 552 | |
| 570 | | | | | | | | | | | | | | | | |
| | 13 | 31 | 49 | 67 | 85 | 103 | 121 | 139 | 157 | 175 | 193 | 211 | 229 | 247 | 265 | |
| 283 | 301 | 319 | 337 | 355 | 373 | 391 | 409 | 427 | 445 | 463 | 481 | 499 | 517 | 535 | 553 | |
| 571 | | | | | | | | | | | | | | | | |
| | 13 | 31 | 49 | 67 | 85 | 103 | 121 | 139 | 157 | 175 | 193 | 211 | 229 | 247 | 265 | |
| 283 | 301 | 319 | 337 | 355 | 373 | 391 | 409 | 427 | 445 | 463 | 481 | 499 | 517 | 535 | 553 | |
| 571 | | | | | | | | | | | | | | | | |
| | 14 | 32 | 50 | 68 | 86 | 104 | 122 | 140 | 158 | 176 | 194 | 212 | 230 | 248 | 266 | |
| 284 | 302 | 320 | 338 | 356 | 374 | 392 | 410 | 428 | 446 | 464 | 482 | 500 | 518 | 536 | 554 | |
| 572 | | | | | | | | | | | | | | | | |
| | 14 | 32 | 50 | 68 | 86 | 104 | 122 | 140 | 158 | 176 | 194 | 212 | 230 | 248 | 266 | |
| 284 | 302 | 320 | 338 | 356 | 374 | 392 | 410 | 428 | 446 | 464 | 482 | 500 | 518 | 536 | 554 | |
| 572 | | | | | | | | | | | | | | | | |
| | 15 | 33 | 51 | 69 | 87 | 105 | 123 | 141 | 159 | 177 | 195 | 213 | 231 | 249 | 267 | |
| 285 | 303 | 321 | 339 | 357 | 375 | 393 | 411 | 429 | 447 | 465 | 483 | 501 | 519 | 537 | 555 | |
| 573 | | | | | | | | | | | | | | | | |
| | 15 | 33 | 51 | 69 | 87 | 105 | 123 | 141 | 159 | 177 | 195 | 213 | 231 | 249 | 267 | |
| 285 | 303 | 321 | 339 | 357 | 375 | 393 | 411 | 429 | 447 | 465 | 483 | 501 | 519 | 537 | 555 | |
| 573 | | | | | | | | | | | | | | | | |
| | 16 | 34 | 52 | 70 | 88 | 106 | 124 | 142 | 160 | 178 | 196 | 214 | 232 | 250 | 268 | |
| 286 | 304 | 322 | 340 | 358 | 376 | 394 | 412 | 430 | 448 | 466 | 484 | 502 | 520 | 538 | 556 | |
| 574 | | | | | | | | | | | | | | | | |
| | 16 | 34 | 52 | 70 | 88 | 106 | 124 | 142 | 160 | 178 | 196 | 214 | 232 | 250 | 268 | |
| 286 | 304 | 322 | 340 | 358 | 376 | 394 | 412 | 430 | 448 | 466 | 484 | 502 | 520 | 538 | 556 | |
| 574 | | | | | | | | | | | | | | | | |
| | 17 | 35 | 53 | 71 | 89 | 107 | 125 | 143 | 161 | 179 | 197 | 215 | 233 | 251 | 269 | |
| 287 | 305 | 323 | 341 | 359 | 377 | 395 | 413 | 431 | 449 | 467 | 485 | 503 | 521 | 539 | 557 | |
| 575 | | | | | | | | | | | | | | | | |
| | 17 | 35 | 53 | 71 | 89 | 107 | 125 | 143 | 161 | 179 | 197 | 215 | 233 | 251 | 269 | |
| 287 | 305 | 323 | 341 | 359 | 377 | 395 | 413 | 431 | 449 | 467 | 485 | 503 | 521 | 539 | 557 | |
| 575 | | | | | | | | | | | | | | | | |
| | 18 | 36 | 54 | 72 | 90 | 108 | 126 | 144 | 162 | 180 | 198 | 216 | 234 | 252 | 270 | |
| 288 | 306 | 324 | 342 | 360 | 378 | 396 | 414 | 432 | 450 | 468 | 486 | 504 | 522 | 540 | 558 | |
| 576 | | | | | | | | | | | | | | | | |
| | 18 | 36 | 54 | 72 | 90 | 108 | 126 | 144 | 162 | 180 | 198 | 216 | 234 | 252 | 270 | |
| 288 | 306 | 324 | 342 | 360 | 378 | 396 | 414 | 432 | 450 | 468 | 486 | 504 | 522 | 540 | 558 | |
| 576 | | | | | | | | | | | | | | | | |

TABLE 3

(Symbol Arrangement after Row Permutation in Interleaver: 36*32)

| | 1 | 19 | 37 | 55 | 73 | 91 | 109 | 127 | 145 | 163 | 181 | 199 | 217 | 235 | 253 | 271 |
|---|---|---|---|---|---|---|---|---|---|---|---|---|---|---|---|---|
| 289 | 307 | 325 | 343 | 361 | 379 | 397 | 415 | 433 | 451 | 469 | 487 | 505 | 523 | 541 | 559 | |
| | 1 | 19 | 37 | 55 | 73 | 91 | 109 | 127 | 145 | 163 | 181 | 199 | 217 | 235 | 253 | 271 |
| 289 | 307 | 325 | 343 | 361 | 379 | 397 | 415 | 433 | 451 | 469 | 487 | 505 | 523 | 541 | 559 | |
| | 2 | 20 | 38 | 56 | 74 | 92 | 110 | 128 | 146 | 164 | 182 | 200 | 218 | 236 | 254 | 272 |
| 290 | 308 | 326 | 344 | 362 | 380 | 398 | 416 | 434 | 452 | 470 | 488 | 506 | 524 | 542 | 560 | |
| | 3 | 21 | 39 | 57 | 75 | 93 | 111 | 129 | 147 | 165 | 183 | 201 | 219 | 237 | 255 | 273 |
| 291 | 309 | 327 | 345 | 363 | 381 | 399 | 417 | 435 | 453 | 471 | 489 | 507 | 525 | 543 | 561 | |
| | 2 | 20 | 38 | 56 | 74 | 92 | 110 | 128 | 146 | 164 | 182 | 200 | 218 | 236 | 254 | 272 |
| 290 | 308 | 326 | 344 | 362 | 380 | 398 | 416 | 434 | 452 | 470 | 488 | 506 | 524 | 542 | 560 | |
| | 4 | 22 | 40 | 58 | 76 | 94 | 112 | 130 | 148 | 166 | 184 | 202 | 220 | 238 | 256 | 274 |
| 292 | 310 | 328 | 346 | 364 | 382 | 400 | 418 | 436 | 454 | 472 | 490 | 508 | 526 | 544 | 562 | |
| | 9 | 27 | 45 | 63 | 81 | 99 | 117 | 135 | 153 | 171 | 189 | 207 | 225 | 243 | 261 | 279 |
| 297 | 315 | 333 | 351 | 369 | 387 | 405 | 423 | 441 | 459 | 477 | 495 | 513 | 531 | 549 | 567 | |

TABLE 3-continued (Symbol Arrangement after Row Permutation in Interleaver: 36*32)

| | 5 | 23 | 41 | 59 | 77 | 95 | 113 | 131 | 149 | 167 | 185 | 203 | 221 | 239 | 257 | 275 |
|---|---|---|---|---|---|---|---|---|---|---|---|---|---|---|---|---|
| 293 | 311 | 329 | 347 | 365 | 383 | 401 | 419 | 437 | 455 | 473 | 491 | 509 | 527 | 545 | 563 | |
| | 6 | 24 | 42 | 60 | 78 | 96 | 114 | 132 | 150 | 168 | 186 | 204 | 222 | 240 | 258 | 276 |
| 294 | 312 | 330 | 348 | 366 | 384 | 402 | 420 | 438 | 456 | 474 | 492 | 510 | 528 | 546 | 564 | |
| | 4 | 22 | 40 | 58 | 76 | 94 | 112 | 130 | 148 | 166 | 184 | 202 | 220 | 238 | 256 | 274 |
| 292 | 310 | 328 | 346 | 364 | 382 | 400 | 418 | 436 | 454 | 472 | 490 | 508 | 526 | 544 | 562 | |
| | 7 | 25 | 43 | 61 | 79 | 97 | 115 | 133 | 151 | 169 | 187 | 205 | 223 | 241 | 259 | 277 |
| 295 | 313 | 331 | 349 | 367 | 385 | 403 | 421 | 439 | 457 | 475 | 493 | 511 | 529 | 547 | 565 | |
| | 8 | 26 | 44 | 62 | 80 | 98 | 116 | 134 | 152 | 170 | 188 | 206 | 224 | 242 | 260 | 278 |
| 296 | 314 | 332 | 350 | 368 | 386 | 404 | 422 | 440 | 458 | 476 | 494 | 512 | 530 | 548 | 566 | |
| | 5 | 23 | 41 | 59 | 77 | 95 | 113 | 131 | 149 | 167 | 185 | 203 | 221 | 239 | 257 | 275 |
| 293 | 311 | 329 | 347 | 365 | 383 | 401 | 419 | 437 | 455 | 473 | 491 | 509 | 527 | 545 | 563 | |
| | 3 | 21 | 39 | 57 | 75 | 93 | 111 | 129 | 147 | 165 | 183 | 201 | 219 | 237 | 255 | 273 |
| 291 | 309 | 327 | 345 | 363 | 381 | 399 | 417 | 435 | 453 | 471 | 489 | 507 | 525 | 543 | 561 | |
| | 13 | 31 | 49 | 67 | 85 | 103 | 121 | 139 | 157 | 175 | 193 | 211 | 229 | 247 | 265 | |
| 283 | 301 | 319 | 337 | 355 | 373 | 391 | 409 | 427 | 445 | 463 | 481 | 499 | 517 | 535 | 553 | |
| 571 | | | | | | | | | | | | | | | | |
| | 10 | 28 | 46 | 64 | 82 | 100 | 118 | 136 | 154 | 172 | 190 | 208 | 226 | 244 | 262 | |
| 280 | 298 | 316 | 334 | 352 | 370 | 388 | 406 | 424 | 442 | 460 | 478 | 496 | 514 | 532 | 550 | |
| 568 | | | | | | | | | | | | | | | | |
| | 11 | 29 | 47 | 65 | 83 | 101 | 119 | 137 | 155 | 173 | 191 | 209 | 227 | 245 | 263 | |
| 281 | 299 | 317 | 335 | 353 | 371 | 389 | 407 | 425 | 443 | 461 | 479 | 497 | 515 | 533 | 551 | |
| 569 | | | | | | | | | | | | | | | | |
| | 7 | 25 | 43 | 61 | 79 | 97 | 115 | 133 | 151 | 169 | 187 | 205 | 223 | 241 | 259 | 277 |
| 295 | 313 | 331 | 349 | 367 | 385 | 403 | 421 | 439 | 457 | 475 | 493 | 511 | 529 | 547 | 565 | |
| | 12 | 30 | 48 | 66 | 84 | 102 | 120 | 138 | 156 | 174 | 192 | 210 | 228 | 246 | 264 | |
| 282 | 300 | 318 | 336 | 354 | 372 | 390 | 408 | 426 | 444 | 462 | 480 | 498 | 516 | 534 | 552 | |
| 570 | | | | | | | | | | | | | | | | |
| | 8 | 26 | 44 | 62 | 80 | 98 | 116 | 134 | 152 | 170 | 188 | 206 | 224 | 242 | 260 | 278 |
| 296 | 314 | 332 | 350 | 368 | 386 | 404 | 422 | 440 | 458 | 476 | 494 | 512 | 530 | 548 | 566 | |
| | 9 | 27 | 45 | 63 | 81 | 99 | 117 | 135 | 153 | 171 | 189 | 207 | 225 | 243 | 261 | 279 |
| 297 | 315 | 333 | 351 | 369 | 387 | 405 | 423 | 441 | 459 | 477 | 495 | 513 | 531 | 549 | 567 | |
| | 6 | 24 | 42 | 60 | 78 | 96 | 114 | 132 | 150 | 168 | 186 | 204 | 222 | 240 | 258 | 276 |
| 294 | 312 | 330 | 348 | 366 | 384 | 402 | 420 | 438 | 456 | 474 | 492 | 510 | 528 | 546 | 564 | |
| | 16 | 34 | 52 | 70 | 88 | 106 | 124 | 142 | 160 | 178 | 196 | 214 | 232 | 250 | 268 | |
| 286 | 304 | 322 | 340 | 358 | 376 | 394 | 412 | 430 | 448 | 466 | 484 | 502 | 520 | 538 | 556 | |
| 574 | | | | | | | | | | | | | | | | |
| | 14 | 32 | 50 | 68 | 86 | 104 | 122 | 140 | 158 | 176 | 194 | 212 | 230 | 248 | 266 | |
| 284 | 302 | 320 | 338 | 356 | 374 | 392 | 410 | 428 | 446 | 464 | 482 | 500 | 518 | 536 | 554 | |
| 572 | | | | | | | | | | | | | | | | |
| | 11 | 29 | 47 | 65 | 83 | 101 | 119 | 137 | 155 | 173 | 191 | 209 | 227 | 245 | 263 | |
| 281 | 299 | 317 | 335 | 353 | 371 | 389 | 407 | 425 | 443 | 461 | 479 | 497 | 515 | 533 | 551 | |
| 569 | | | | | | | | | | | | | | | | |
| | 12 | 30 | 48 | 66 | 84 | 102 | 120 | 138 | 156 | 174 | 192 | 210 | 228 | 246 | 264 | |
| 282 | 300 | 318 | 336 | 354 | 372 | 390 | 408 | 426 | 444 | 462 | 480 | 498 | 516 | 534 | 552 | |
| 570 | | | | | | | | | | | | | | | | |
| | 15 | 33 | 51 | 69 | 87 | 105 | 123 | 141 | 159 | 177 | 195 | 213 | 231 | 249 | 267 | |
| 285 | 303 | 321 | 339 | 357 | 375 | 393 | 411 | 429 | 447 | 465 | 483 | 501 | 519 | 537 | 555 | |
| 573 | | | | | | | | | | | | | | | | |
| | 13 | 31 | 49 | 67 | 85 | 103 | 121 | 139 | 157 | 175 | 193 | 211 | 229 | 247 | 265 | |
| 283 | 301 | 319 | 337 | 355 | 373 | 391 | 409 | 427 | 445 | 463 | 481 | 499 | 517 | 535 | 553 | |
| 571 | | | | | | | | | | | | | | | | |
| | 14 | 32 | 50 | 68 | 86 | 104 | 122 | 140 | 158 | 176 | 194 | 212 | 230 | 248 | 266 | |
| 284 | 302 | 320 | 338 | 356 | 374 | 392 | 410 | 428 | 446 | 464 | 482 | 500 | 518 | 536 | 554 | |
| 572 | | | | | | | | | | | | | | | | |
| | 10 | 28 | 46 | 64 | 82 | 100 | 118 | 136 | 154 | 172 | 190 | 208 | 226 | 244 | 262 | |
| 280 | 298 | 316 | 334 | 352 | 370 | 388 | 406 | 424 | 442 | 460 | 478 | 496 | 514 | 532 | 550 | |
| 568 | | | | | | | | | | | | | | | | |
| | 15 | 33 | 51 | 69 | 87 | 105 | 123 | 141 | 159 | 177 | 195 | 213 | 231 | 249 | 267 | |
| 285 | 303 | 321 | 339 | 357 | 375 | 393 | 411 | 429 | 447 | 465 | 483 | 501 | 519 | 537 | 555 | |
| 573 | | | | | | | | | | | | | | | | |
| | 17 | 35 | 53 | 71 | 89 | 107 | 125 | 143 | 161 | 179 | 197 | 215 | 233 | 251 | 269 | |
| 287 | 305 | 323 | 341 | 359 | 377 | 395 | 413 | 431 | 449 | 467 | 485 | 503 | 521 | 539 | 557 | |
| 575 | | | | | | | | | | | | | | | | |
| | 16 | 34 | 52 | 70 | 88 | 106 | 124 | 142 | 160 | 178 | 196 | 214 | 232 | 250 | 268 | |
| 286 | 304 | 322 | 340 | 358 | 376 | 394 | 412 | 430 | 448 | 466 | 484 | 502 | 520 | 538 | 556 | |
| 574 | | | | | | | | | | | | | | | | |
| | 17 | 35 | 53 | 71 | 89 | 107 | 125 | 143 | 161 | 179 | 197 | 215 | 233 | 251 | 269 | |
| 287 | 305 | 323 | 341 | 359 | 377 | 395 | 413 | 431 | 449 | 467 | 485 | 503 | 521 | 539 | 557 | |
| 575 | | | | | | | | | | | | | | | | |
| | 18 | 36 | 54 | 72 | 90 | 108 | 126 | 144 | 162 | 180 | 198 | 216 | 234 | 252 | 270 | |
| 288 | 306 | 324 | 342 | 360 | 378 | 396 | 414 | 432 | 450 | 468 | 486 | 504 | 522 | 540 | 558 | |
| 576 | | | | | | | | | | | | | | | | |
| | 18 | 36 | 54 | 72 | 90 | 108 | 126 | 144 | 162 | 180 | 198 | 216 | 234 | 252 | 270 | |
| 288 | 306 | 324 | 342 | 360 | 378 | 396 | 414 | 432 | 450 | 468 | 486 | 504 | 522 | 540 | 558 | |
| 576 | | | | | | | | | | | | | | | | |

TABLE 4

| (Symbols Transmitted to Carrier A from the Interleaver: 1*384) |
|---|

| | | | | | | | | | | | | |
|---|---|---|---|---|---|---|---|---|---|---|---|---|
| Columns 1 through 12 | 1 | 55 | 109 | 163 | 217 | 271 | 325 | 379 | 433 | 487 | 541 | 19 |
| Columns 13 through 24 | 73 | 127 | 181 | 235 | 289 | 343 | 397 | 451 | 505 | 559 | 38 | 92 |
| Columns 25 through 36 | 146 | 200 | 254 | 308 | 362 | 416 | 470 | 524 | 3 | 57 | 111 | 165 |
| Columns 37 through 48 | 219 | 273 | 327 | 381 | 435 | 489 | 543 | 20 | 74 | 128 | 182 | 236 |
| Columns 49 through 60 | 290 | 344 | 398 | 452 | 506 | 560 | 40 | 94 | 148 | 202 | 256 | 310 |
| Columns 61 through 72 | 364 | 418 | 472 | 526 | 9 | 63 | 117 | 171 | 225 | 279 | 333 | 387 |
| Columns 73 through 84 | 441 | 495 | 549 | 23 | 77 | 131 | 185 | 239 | 293 | 347 | 401 | 455 |
| Columns 85 through 96 | 509 | 563 | 42 | 96 | 150 | 204 | 258 | 312 | 366 | 420 | 474 | 528 |
| Columns 97 through 108 | 4 | 58 | 112 | 166 | 220 | 274 | 328 | 382 | 436 | 490 | 544 | 25 |
| Columns 109 through 120 | 79 | 133 | 187 | 241 | 295 | 349 | 403 | 457 | 511 | 565 | 44 | 98 |
| Columns 121 through 132 | 152 | 206 | 260 | 314 | 368 | 422 | 476 | 530 | 5 | 59 | 113 | 167 |
| Columns 133 through 144 | 221 | 275 | 329 | 383 | 437 | 491 | 545 | 21 | 75 | 129 | 183 | 237 |
| Columns 145 through 156 | 291 | 345 | 399 | 453 | 507 | 561 | 49 | 103 | 157 | 211 | 265 | 319 |
| Columns 157 through 168 | 373 | 427 | 481 | 535 | 10 | 64 | 118 | 172 | 226 | 280 | 334 | 388 |
| Columns 169 through 180 | 442 | 496 | 550 | 29 | 83 | 137 | 191 | 245 | 299 | 353 | 407 | 461 |
| Columns 181 through 192 | 515 | 569 | 43 | 97 | 151 | 205 | 259 | 313 | 367 | 421 | 475 | 529 |
| Columns 193 through 204 | 12 | 66 | 120 | 174 | 228 | 282 | 336 | 390 | 444 | 498 | 552 | 26 |
| Columns 205 through 216 | 80 | 134 | 188 | 242 | 296 | 350 | 404 | 458 | 512 | 566 | 45 | 99 |
| Columns 217 through 228 | 153 | 207 | 261 | 315 | 369 | 423 | 477 | 531 | 6 | 60 | 114 | 168 |
| Columns 229 through 240 | 222 | 276 | 330 | 384 | 438 | 492 | 546 | 34 | 88 | 142 | 196 | 250 |
| Columns 241 through 252 | 304 | 358 | 412 | 466 | 520 | 574 | 50 | 104 | 158 | 212 | 266 | 320 |
| Columns 253 through 264 | 374 | 428 | 482 | 536 | 11 | 65 | 119 | 173 | 227 | 281 | 335 | 389 |
| Columns 265 through 276 | 443 | 497 | 551 | 30 | 84 | 138 | 192 | 246 | 300 | 354 | 408 | 462 |
| Columns 277 through 288 | 516 | 570 | 51 | 105 | 159 | 213 | 267 | 321 | 375 | 429 | 483 | 537 |
| Columns 289 through 300 | 13 | 67 | 121 | 175 | 229 | 283 | 337 | 391 | 445 | 499 | 553 | 32 |
| Columns 301 through 312 | 86 | 140 | 194 | 248 | 302 | 356 | 410 | 464 | 518 | 572 | 46 | 100 |
| Columns 313 through 324 | 154 | 208 | 262 | 316 | 370 | 424 | 478 | 532 | 15 | 69 | 123 | 177 |
| Columns 325 through 336 | 231 | 285 | 339 | 393 | 447 | 501 | 555 | 35 | 89 | 143 | 197 | 251 |
| Columns 337 through 348 | 305 | 359 | 413 | 467 | 521 | 575 | 52 | 106 | 160 | 214 | 268 | 322 |
| Columns 349 through 360 | 376 | 430 | 484 | 538 | 17 | 71 | 125 | 179 | 233 | 287 | 341 | 395 |
| Columns 361 through 372 | 449 | 503 | 557 | 36 | 90 | 144 | 198 | 252 | 306 | 360 | 414 | 468 |
| Columns 373 through 384 | 522 | 576 | 54 | 108 | 162 | 216 | 270 | 324 | 378 | 432 | 486 | 540 |

TABLE 5

| (Symbols Transmitted to Carrier B from the Interleaver: 1*384) |
|---|

| | | | | | | | | | | | | |
|---|---|---|---|---|---|---|---|---|---|---|---|---|
| Columns 1 through 12 | 19 | 73 | 127 | 181 | 235 | 289 | 343 | 397 | 451 | 505 | 559 | 37 |
| Columns 13 through 24 | 91 | 145 | 199 | 253 | 307 | 361 | 415 | 469 | 523 | 2 | 56 | 110 |
| Columns 25 through 36 | 164 | 218 | 272 | 326 | 380 | 434 | 488 | 542 | 21 | 75 | 129 | 183 |
| Columns 37 through 48 | 237 | 291 | 345 | 399 | 453 | 507 | 561 | 38 | 92 | 146 | 200 | 254 |
| Columns 49 through 60 | 308 | 362 | 416 | 470 | 524 | 4 | 58 | 112 | 166 | 220 | 274 | 328 |
| Columns 61 through 72 | 382 | 436 | 490 | 544 | 27 | 81 | 135 | 189 | 243 | 297 | 351 | 405 |
| Columns 73 through 84 | 459 | 513 | 567 | 41 | 95 | 149 | 203 | 257 | 311 | 365 | 419 | 473 |
| Columns 85 through 96 | 527 | 6 | 60 | 114 | 168 | 222 | 276 | 330 | 384 | 438 | 492 | 546 |
| Columns 97 through 108 | 22 | 76 | 130 | 184 | 238 | 292 | 346 | 400 | 454 | 508 | 562 | 43 |
| Columns 109 through 120 | 97 | 151 | 205 | 259 | 313 | 367 | 421 | 475 | 529 | 8 | 62 | 116 |
| Columns 121 through 132 | 170 | 224 | 278 | 332 | 386 | 440 | 494 | 548 | 23 | 77 | 131 | 185 |
| Columns 133 through 144 | 239 | 293 | 347 | 401 | 455 | 509 | 563 | 39 | 93 | 147 | 201 | 255 |
| Columns 145 through 156 | 309 | 363 | 417 | 471 | 525 | 13 | 67 | 121 | 175 | 229 | 283 | 337 |
| Columns 157 through 168 | 391 | 445 | 499 | 553 | 28 | 82 | 136 | 190 | 244 | 298 | 352 | 406 |
| Columns 169 through 180 | 460 | 514 | 568 | 47 | 101 | 155 | 209 | 263 | 317 | 371 | 425 | 479 |
| Columns 181 through 192 | 533 | 7 | 61 | 115 | 169 | 223 | 277 | 331 | 385 | 439 | 493 | 547 |
| Columns 193 through 204 | 30 | 84 | 138 | 192 | 246 | 300 | 354 | 408 | 462 | 516 | 570 | 44 |
| Columns 205 through 216 | 98 | 152 | 206 | 260 | 314 | 368 | 422 | 476 | 530 | 9 | 63 | 117 |
| Columns 217 through 228 | 171 | 225 | 279 | 333 | 387 | 441 | 495 | 549 | 24 | 78 | 132 | 186 |
| Columns 229 through 240 | 240 | 294 | 348 | 402 | 456 | 510 | 564 | 52 | 106 | 160 | 214 | 268 |
| Columns 241 through 252 | 322 | 376 | 430 | 484 | 538 | 14 | 68 | 122 | 176 | 230 | 284 | 338 |
| Columns 253 through 264 | 392 | 446 | 500 | 554 | 29 | 83 | 137 | 191 | 245 | 299 | 353 | 407 |
| Columns 265 through 276 | 461 | 515 | 569 | 48 | 102 | 156 | 210 | 264 | 318 | 372 | 426 | 480 |
| Columns 277 through 288 | 534 | 15 | 69 | 123 | 177 | 231 | 285 | 339 | 393 | 447 | 501 | 555 |
| Columns 289 through 300 | 31 | 85 | 139 | 193 | 247 | 301 | 355 | 409 | 463 | 517 | 571 | 50 |
| Columns 301 through 312 | 104 | 158 | 212 | 266 | 320 | 374 | 428 | 482 | 536 | 10 | 64 | 118 |
| Columns 313 through 324 | 172 | 226 | 280 | 334 | 388 | 442 | 496 | 550 | 33 | 87 | 141 | 195 |
| Columns 325 through 336 | 249 | 303 | 357 | 411 | 465 | 519 | 573 | 53 | 107 | 161 | 215 | 269 |
| Columns 337 through 348 | 323 | 377 | 431 | 485 | 539 | 16 | 70 | 124 | 178 | 232 | 286 | 340 |
| Columns 349 through 360 | 394 | 448 | 502 | 556 | 35 | 89 | 143 | 197 | 251 | 305 | 359 | 413 |
| Columns 361 through 372 | 467 | 521 | 575 | 54 | 108 | 162 | 216 | 270 | 324 | 378 | 432 | 486 |
| Columns 373 through 384 | 540 | 18 | 72 | 126 | 180 | 234 | 288 | 342 | 396 | 450 | 504 | 558 |

TABLE 6

(Symbols Transmitted to Carrier C from the Interleaver: 1*384)

| | | | | | | | | | | | | |
|---|---|---|---|---|---|---|---|---|---|---|---|---|
| Columns 1 through 12 | 37 | 91 | 145 | 199 | 253 | 307 | 361 | 415 | 469 | 523 | 1 | 55 |
| Columns 13 through 24 | 109 | 163 | 217 | 271 | 325 | 379 | 433 | 487 | 541 | 20 | 74 | 128 |
| Columns 25 through 36 | 182 | 236 | 290 | 344 | 398 | 452 | 506 | 560 | 39 | 93 | 147 | 201 |
| Columns 37 through 48 | 255 | 309 | 363 | 417 | 471 | 525 | 2 | 56 | 110 | 164 | 218 | 272 |
| Columns 49 through 60 | 326 | 380 | 434 | 488 | 542 | 22 | 76 | 130 | 184 | 238 | 292 | 346 |
| Columns 61 through 72 | 400 | 454 | 508 | 562 | 45 | 99 | 153 | 207 | 261 | 315 | 369 | 423 |
| Columns 73 through 84 | 477 | 531 | 5 | 59 | 113 | 167 | 221 | 275 | 329 | 383 | 437 | 491 |
| Columns 85 through 96 | 545 | 24 | 78 | 132 | 186 | 240 | 294 | 348 | 402 | 456 | 510 | 564 |
| Columns 97 through 108 | 40 | 94 | 148 | 202 | 256 | 310 | 364 | 418 | 472 | 526 | 7 | 61 |
| Columns 109 through 120 | 115 | 169 | 223 | 277 | 331 | 385 | 439 | 493 | 547 | 26 | 80 | 134 |
| Columns 121 through 132 | 188 | 242 | 296 | 350 | 404 | 458 | 512 | 566 | 41 | 95 | 149 | 203 |
| Columns 133 through 144 | 257 | 311 | 365 | 419 | 473 | 527 | 3 | 57 | 111 | 165 | 219 | 273 |
| Columns 145 through 156 | 327 | 381 | 435 | 489 | 543 | 31 | 85 | 139 | 193 | 247 | 301 | 355 |
| Columns 157 through 168 | 409 | 463 | 517 | 571 | 46 | 100 | 154 | 208 | 262 | 316 | 370 | 424 |
| Columns 169 through 180 | 478 | 532 | 11 | 65 | 119 | 173 | 227 | 281 | 335 | 389 | 443 | 497 |
| Columns 181 through 192 | 551 | 25 | 79 | 133 | 187 | 241 | 295 | 349 | 403 | 457 | 511 | 565 |
| Columns 193 through 204 | 48 | 102 | 156 | 210 | 264 | 318 | 372 | 426 | 480 | 534 | 8 | 62 |
| Columns 205 through 216 | 116 | 170 | 224 | 278 | 332 | 386 | 440 | 494 | 548 | 27 | 81 | 135 |
| Columns 217 through 228 | 189 | 243 | 297 | 351 | 405 | 459 | 513 | 567 | 42 | 96 | 150 | 204 |
| Columns 229 through 240 | 258 | 312 | 366 | 420 | 474 | 528 | 16 | 70 | 124 | 178 | 232 | 286 |
| Columns 241 through 252 | 340 | 394 | 448 | 502 | 556 | 32 | 86 | 140 | 194 | 248 | 302 | 356 |
| Columns 253 through 264 | 410 | 464 | 518 | 572 | 47 | 101 | 155 | 209 | 263 | 317 | 371 | 425 |
| Columns 265 through 276 | 479 | 533 | 12 | 66 | 120 | 174 | 228 | 282 | 336 | 390 | 444 | 498 |
| Columns 277 through 288 | 552 | 33 | 87 | 141 | 195 | 249 | 303 | 357 | 411 | 465 | 519 | 573 |
| Columns 289 through 300 | 49 | 103 | 157 | 211 | 265 | 319 | 373 | 427 | 481 | 535 | 14 | 68 |
| Columns 301 through 312 | 122 | 176 | 230 | 284 | 338 | 392 | 446 | 500 | 554 | 28 | 82 | 136 |
| Columns 313 through 324 | 190 | 244 | 298 | 352 | 406 | 460 | 514 | 568 | 51 | 105 | 159 | 213 |
| Columns 325 through 336 | 267 | 321 | 375 | 429 | 483 | 537 | 17 | 71 | 125 | 179 | 233 | 287 |
| Columns 337 through 348 | 341 | 395 | 449 | 503 | 557 | 34 | 88 | 142 | 196 | 250 | 304 | 358 |
| Columns 349 through 360 | 412 | 466 | 520 | 574 | 53 | 107 | 161 | 215 | 269 | 323 | 377 | 431 |
| Columns 361 through 372 | 485 | 539 | 18 | 72 | 126 | 180 | 234 | 288 | 342 | 396 | 450 | 504 |
| Columns 373 through 384 | 558 | 36 | 90 | 144 | 198 | 252 | 306 | 360 | 414 | 468 | 522 | 576 |

It is noted from Tables 4 to 6 that there are no repeated symbols overlapped in the respective carriers and the repeated symbols are allocated to the different carriers.

Although the present invention has been described with reference to the embodiments using the 1/3 and 1/6 coding rates, it will be appreciated that the coding rate can be changed without departing from the sprit and scope of the invention. In such a case, the repetition times of the symbol repeaters should be properly changed and the interleavers should be designed to uniformly distribute the symbols of the same data to the carriers.

Further, while the invention has been described with reference to the overlay scheme in which the IS-95 system and the multicarrier system share the frequency bands, it will be appreciated that the invention is also applicable to the multicarrier system with a non-overlay scheme. In the case that some of the multiple carriers are poor, since the symbols of the same data are uniformly distributed to the other carriers, the mobile station can demodulate the original data by using the data received through the good carrier. Thus, the embodiments of the present invention have increased channel performance.

Although the present invention has been described with reference to the multicarrier system having 5 MHz frequency band, it will be appreciated that the present invention is also applicable to multicarrier systems having 10 MHz (6 carriers) or 20 MHz (12 carriers) frequency band.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for realizing a forward link of a CDMA (Code Division Multiple Access) communication system which outputs multicarrier transmission signals on each channel of the communication system, comprising the steps of:

repeating full rate symbols such that a number of encoded symbols for each input data bit is at least twice the number of carriers;

repeating symbols of other rates to match a number of the symbols to the number of the full rate symbols; and interleaving the repeated symbols such that the encoded symbols of the same input data bit are uniformly distributed among the carriers.

2. A method for realizing a forward link of a CDMA (Code Division Multiple Access) communication system which outputs multicarrier transmission signals on each channel of the communication system, comprising the steps of:

encoding transmission data of at least two different rates with a predetermined coding rate to generate symbols of respective rates;

repeating full rate symbols such that a number of encoded symbols for each input data bit are at least twice the number of carriers, and repeating symbols of the other rates such that the symbols of the other rates are equal in number to the full rate symbols; and interleaving the repeated symbols such that the encoded symbols of the same input data bit are uniformly distributed among the carriers.

3. A method for realizing a forward link of a CDMA (Code Division Multiple Access) communication system which outputs multicarrier transmission signals on each channel of the communication system, comprising the steps of:
- encoding transmission data of a plurality of rates with a predetermined coding rate such that a number of full rate encoded symbols for each input data bit is at least twice a number of carriers;
- repeating symbols such that the symbols of each rate is equal in number to the full rate symbols; and
- interleaving the repeated symbols such that the encoded symbols of the same input data bit are uniformly distributed among the carriers.

4. A forward link device of a CDMA communication system which outputs multicarrier transmission signals on each channel of the communication system, the forward link comprising:
- a plurality of encoders for encoding input data of corresponding rates into symbols with corresponding coding rates, respectively;
- a plurality of repeaters including a first repeater for repeating full rate symbols and other repeaters for repeating symbols of other rates, wherein the first repeater repeats the full rate symbols such that the number of the full rate encoded symbols for each input data bit is at least twice the number of carriers, wherein the other repeaters repeat the symbols output from the corresponding encoders to be equal in number to the full rate symbols; and
- a plurality of interleavers for interleaving the repeated symbols to uniformly distribute the encoded symbols of the same input data bit output from the repeaters among the carriers.

5. A forward link device of a CDMA communication system which outputs multicarrier transmission signals on each channel of the communication system, the forward link comprising:
- encoders for encoding input data of corresponding rates into symbols with a corresponding coding rate, respectively, the coding rate being determined such that the number of full rate encoded symbols for each input data bit is at least twice the number of carriers;
- repeaters for repeating symbols output from the corresponding encoders to be equal in number to the full rate symbols; and
- interleavers for uniformly distributing the repeated symbols of the same input data bit among the carriers.

6. A forward link device of a multicarrier CDMA communication system outputting multicarrier transmission signals on each channel of the communication system by overlaying three carriers extending over 5 MHz on same frequency bands as an IS-95 system, the forward link comprising:
- first to fourth encoders for encoding input data of corresponding rates with a 1/3 coding rate, respectively;
- a plurality of repeaters including a first repeater for repeating each input data two times full rate symbols output from the first encoder and second to fourth repeaters for repeating each of the input symbols output from the second to fourth encoders, respectively, to match the number of corresponding output symbols to the number of full rate symbols; and
- first to fourth interleavers for interleaving the repeated symbols output from the first to fourth repeaters, respectively, to uniformly distribute the encoded symbols of the same input data bit among the carriers.

7. A forward link device of a multicarrier CDMA communication system outputting multicarrier transmission signals on each channel of the communication system by overlaying three carriers extending over 5 MHz on same frequency bands as an IS-95 system, the forward link comprising:
- first to fourth encoders for encoding input data of first to fourth rates with a 1/6 coding rate, respectively;
- first to fourth for repeating symbols output from the second to fourth encoders, respectively, to match the number of corresponding output symbols to the number of full rate symbols output from the first encoder; and
- first to fourth interleavers for interleaving the repeated symbols output from the first encoder and the second to fourth repeaters, respectively, to uniformly distribute the encoded symbols for each input data bit among the carriers.

8. The method as claimed in claim 1, wherein said step of repeating encoded symbols of other rates is performed a predetermined number of times.

9. The apparatus as claimed in claim 5, wherein a number of said repeaters is less than a number of said encoders.

10. A base station system transmitting information data to a mobile station through multiple transmitting carrier frequencies on each channel of the communication system, the system comprising:
- a channel encoder for encoding the information data to a plurality of encoded symbols;
- an interleaver, coupled to the channel encoder, for interleaving the encoded symbols; and
- a demultiplexer, coupled to the interleaver, for distributing the encoded symbols output from the interleaver to the multiple transmitting carrier frequencies, wherein encoded symbols corresponding to each information bit are uniformly distributed among each of the multiple transmitting carrier frequencies.

* * * * *